(12) United States Patent
Aher et al.

(10) Patent No.: US 11,604,845 B2
(45) Date of Patent: Mar. 14, 2023

(54) SYSTEMS AND METHODS FOR PROCESSING EMOJIS IN A SEARCH AND RECOMMENDATION ENVIRONMENT

(71) Applicant: Rovi Guides, Inc., San Jose, CA (US)

(72) Inventors: Ankur Anil Aher, Maharashtra (IN); Susanto Sen, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/849,565

(22) Filed: Apr. 15, 2020

(65) Prior Publication Data

US 2021/0326398 A1    Oct. 21, 2021

(51) Int. Cl.
  *G06F 16/9535*    (2019.01)
  *G06F 40/30*    (2020.01)

(52) U.S. Cl.
  CPC .......... *G06F 16/9535* (2019.01); *G06F 40/30* (2020.01)

(58) Field of Classification Search
  CPC .............................. G06F 16/9535; G06F 40/30
  See application file for complete search history.

(56) References Cited

U.S. PATENT DOCUMENTS

| | | |
|---|---|---|
| 11,204,959 B1 | 12/2021 | Boyd et al. |
| 2013/0151508 A1 | 6/2013 | Kurabayashi et al. |
| 2014/0161356 A1 | 6/2014 | Tesch et al. |
| 2015/0007030 A1 | 1/2015 | Noy |
| 2015/0100537 A1 | 4/2015 | Grieves et al. |
| 2016/0292148 A1 | 10/2016 | Aley et al. |
| 2017/0154055 A1 | 6/2017 | Dimson et al. |
| 2017/0308290 A1 | 10/2017 | Patel |
| 2018/0255009 A1* | 9/2018 | Chen ...................... H04L 67/22 |
| 2018/0348890 A1 | 12/2018 | Yang et al. |
| 2019/0379942 A1 | 12/2019 | Han et al. |
| 2020/0057804 A1 | 2/2020 | Apanovych et al. |
| 2021/0141866 A1 | 5/2021 | Chen et al. |
| 2021/0326390 A1 | 10/2021 | Aher et al. |

OTHER PUBLICATIONS

U.S. Appl. No. 16/849,570, filed Apr. 15, 2020, Ankur Anil Aher. Application as filed in U.S. Appl. No. 16/828,653, filed Mar. 24, 2020.

* cited by examiner

*Primary Examiner* — Truong V Vo
(74) *Attorney, Agent, or Firm* — Haley Guiliano LLP

(57) ABSTRACT

Systems and methods are described herein to search for content recommendations, and in particular, for generating emoji-based metadata for content and processing an emoji-based query using the emoji-based metadata. A system identifies a content item posted via one or more social platforms. A system may retrieve a quantity of instances of a reaction to the content item. The reaction may correspond to an emoji. A system may retrieve a comment posted in association with the content item via the one or more social platforms. A system may map the comment to the emoji based on a rule. The system may generate a factor associated with the content item and the emoji based on the quantity of instances of the reaction and based on the mapping of the comment to the emoji. The system stores the factor in a database in association with an identifier of the content item to facilitate processing of an emoji-based query.

20 Claims, 13 Drawing Sheets

SYSTEMS AND METHODS FOR PROCESSING EMOJIS IN A SEARCH AND RECOMMENDATION ENVIRONMENT

BACKGROUND OF THE INVENTION

The present disclosure is directed to systems and methods for searching for content recommendations, and in particular, for generating emoji-based metadata for content and processing an emoji-based query using the emoji-based metadata.

SUMMARY

Searching for content on devices has changed dramatically with the introduction of emojis in recent years. Emojis are small digital images used in electronic messages, and they exist in various genres, including facial expressions, common objects, places and types of weather, and animals. The introduction and proliferation of emojis has changed input search queries too. For example, to search for science fiction movies, a user may wish to type "👽 movies" instead of "sci-fi movies." For example, to search for romantic comedy shows, a user could input a search query including emojis such as "☺ ♥ shows." Thus, input search strings may no longer be solely text-based, but rather, could include a combination of text and emojis. A search and recommendations system needs to be able to handle and process such inputs.

User-generated content continues to gain interest in recent years. User-generated content may be posted on various online channels where users and/or channel holders upload content. However, user-generated content might not be associated with enriched metadata. Such content, without associated, well-defined, and enriched metadata, creates a challenge for search and recommendations systems when searching for content based on an input query (e.g., a text string like "detective movies").

To address these shortcomings, systems and methods are described herein for a search and recommendations engine that generates emoji-based metadata associated with content and processes an emoji-based query using the emoji-based metadata.

Content without enriched metadata may have information about reactions associated with the content. For example, a user-generated video posted on social media has associated reaction data corresponding to emojis and/or user comments. The information about reactions can be used to generate emoji-based metadata that a system uses to search for content and recommend content. A search and recommendations system may identify one or more content items uploaded (i.e., posted) to one or more social platforms. For example, a user posted a video titled "Crying Babies" on several social platforms (e.g., Facebook, Twitter, etc.). The system identifies the video on any one or more of the social platforms. In some embodiments, the system may identify a content item based on an identifier (e.g., a video title) on one or more social platforms. A system as described in the present disclosure includes control circuitry and storage with appropriate circuitry. In some embodiments, the system includes one or more input/output paths with suitable communications circuitry.

A system may retrieve information about instances of a reaction to a content item. In some embodiments, the system retrieves a quantity and/or a frequency of instances of a reaction to a content item. For example, users indicated their reactions to a video titled "Crying Babies" by an interaction with a reaction icon. A reaction icon corresponds to an emoji. For example, the video titled "Crying Babies" has an emoji count of 6000 for 👶 and an emoji count of 4000 for ♥. In another non-limiting example, the video titled "Crying Babies" has an emoji frequency of 20 👶 per second.

A system may retrieve a comment associated with a content item. In some embodiments, the comment has been posted on the same social platform as the content item or another social platform but associated with the content item. The system using control circuitry may identify a comment that is associated with a content item based on the one or more social platforms. In response to identifying the comment associated with the content item, the system using control circuitry may retrieve the comment from the corresponding social platform. For example, a user posted a comment about a video titled "Crying Babies" that was uploaded to YouTube. In this example, the user posted the comment on YouTube in a comments section tied to the video. In another example, the user posted the comment on Facebook and associated the comment to the video by including a link of the video uploaded on YouTube. The system may identify the comment on Facebook as associated with "Crying Babies" based on the link and retrieve the comment from Facebook in response.

A system may map a comment to an emoji based on a rule. In some embodiments, a comment is automatically mapped to an emoji based on a rule. In some embodiments, the rule is based at least in part on sentiment analysis. The system using control circuitry executes sentiment analysis on the comment and determines an emoji corresponding to a comment based on sentiment analysis. The system generates a mapping from the comment to the emoji. In some embodiments, one or more emojis correspond to a comment based on sentiment analysis. The system determines associated weights with the one or more emojis based on the sentiment analysis and generates a mapping based on the associated weights. For example, a comment associated with the video titled "Crying Babies" is "Ha Ha, I love it." The system executes sentiment analysis on the comment and determines that the comment corresponds to both ☺ and ♥. The system determines, based on the sentiment analysis, that the comment corresponds to a weight of 0.4 associated with ☺ and a weight of 0.6 associated with ♥. The system then generates a mapping from the comment to the emojis based on the associated weights.

A system may generate a factor associated with a content item and an emoji. In some embodiments, the system generates a factor based on information about instances of a reaction associated with a content item and based on mapping of a comment associated with a content item to an emoji. In some embodiments, the system generates emoji-based metadata based on the factor and the emoji. In some embodiments, the system may generate a factor associated with a content item and an emoji based on frequency of instances of a reaction associated with a content item. In some embodiments, the system generates a closeness factor to an emoji for approximate matching techniques (e.g., fuzzy matching). For example, if a content item matches ☺, the system also generates high closeness factors to some emojis (e.g., 👶, 🙂) and low closeness factors to others (e.g., ☹). In some embodiments, a system may generate match factors associated with an emoji that is associated with an opposite reaction (i.e., a low closeness factor). For example, the system generates a high match factor for ☺ and a low match factor for ☹ at the same time based on reaction data and closeness factors. In some embodiments, the system may generate a statistics-based match factor associated with a content item and an emoji. The statistical match factor is based on information about instances of a reaction associated with a content item. For example, a video titled "Crying Babies" has various associated reaction data (e.g., count, frequency, associated emoji types, distribution, etc.). The system generates statistical data based on the reaction data (e.g., average count, average frequency, variance, skew, etc.). The system generates the emoji match factor based on the statistical data (e.g., based on average frequency).

In some embodiments, a content item includes one or more portions of the content item. For example, a video titled "Crying Babies" includes three portions (i.e., scenes in the video). A system may determine quantities of instances of a reaction associated with each portion based on information about instances of a reaction associated with a content item. The system maps one or more emojis to each portion based on a rule as previously described in the present disclosure. The system generates and associates a factor with each portion based on information about instances of a reaction associated with a content item. In some embodiments, the system may determine a genre of a portion of a content item. The system associates a factor with the genre of a portion. For example, the system determines a scene in a video titled "Crying Babies" is associated with ☺. Accordingly, the system determines the scene is associated with comedy or a related genre and associates a match factor with the scene genre.

A system may store a factor associated with a content item and an emoji. In some embodiments, the system stores the factor in a database in association with an identifier of the content item. For example, the system has generated a match factor based on information about reactions to a video titled "Crying Babies". The system stores the match factor in a data structure associated with the title identifier "Crying Babies". The match factor may facilitate processing of an emoji-based query.

In some embodiments, a system may process a query having one or more emojis (i.e., emoji-based query) using a match factor. The system receives a query including a text portion and an emoji portion. The system searches a content database to identify content items associated with the query based on the text and emoji portions. In some embodiments, the content database may include a mix of content types (e.g., movies, music, images). In some embodiments, the system may search based on the emoji portion (at least in part) by matching emojis associated with a content item. For example, the system receives a query to search for "☺ ♥ movies". The system searches for content items associated with ☺, ♥, and movies. The system may execute a matching algorithm (e.g., fuzzy matching) between components of the query and metadata associated with the content items (e.g., between ☺ and emoji-based metadata). In this non-limiting example, the system may find movies that are associated with ☺ but not ♥ based on the matching algorithm and determine the movies are not a match for the query. The system finds movies that match both ☺ and ♥ based on the matching algorithm and identifies the content items as a match for the query.

In some embodiments, a system retrieves match scores associated with a content item from a database. In some embodiments, the system retrieves an emoji match score based on an emoji portion of a query and a textual match score based on a text portion of a query. In some embodiments, the system may retrieve respective match scores for each content item of several identified content items based on the search query. For example, a user searches for "☺ ♥ movies". The system has identified content items associated with ☺, ♥, and movies. The system retrieves associated emoji and textual match scores (e.g., from metadata). Based on the associated match scores, the system determines certain content items are a better match for the search query relative to other content items. In some embodiments, the system may rank the content items based on the match scores. For example, a video titled "Crying Babies" has a high match score for ☺, ♥, and movies. However, a video titled "Truck Drivers" has a low match score for ♥ and movies and a high match score for ☺. Then, the system ranks "Crying Babies" first and "Truck Drivers" second in the search results based on the match score for ♥. In some embodiments, the system may generate an aggregate score based on associated match scores. The aggregate score is based on emoji match scores and textual match scores. For example, the system generates aggregate scores for "Crying Babies" and "Truck Drivers" based on the respective match scores for ☺, ♥, and movies (e.g., by summing and normalizing the match scores to the same range). Following this non-limiting example, the system ranks "Crying Babies" first and "Truck Drivers" second based on the aggregate scores.

In some embodiments, a system generates for display or causes to be displayed representations of the content items. In some embodiments, the system may cause to be displayed the representations on a remote device different from the system. In some embodiments, the system may order the representations of the content items according to the respective aggregate scores. In some embodiments, representations of the content items include portions of the content items. For example, a search query of "☺ ♥ movies" results in the videos "Crying Babies" and "Truck Drivers". The system displays a thumbnail of the videos as representations for the results. In another non-limiting example, the system displays a short clip from each video to represent the results.

In some embodiments, a system translates an emoji portion of an emoji-based query into text. The system retrieves a second textual match score based on the translated emoji portion for a content item. The system generates a second aggregate score for a content item based on the first aggregate score and the second textual match score. In some embodiments, the system may retrieve respective textual match scores for one or more content items based on the translated emoji portion in order to generate respective second aggregate scores for each content item as described herein. In some embodiments, the first aggregate score and translated emoji portion may contribute differently to the second aggregate score. For example, the system translates ☺ as a text string, "comedy". The system retrieves different match scores for ☺ and "comedy" for a video titled "Truck Drivers" from associated metadata. In this example, the system retrieves a match score for ☺ from emoji-based metadata and a match score for comedy from other metadata. The system may generate a more accurate aggregate match score for "Truck Drivers" after including the translated emoji portion.

In some embodiments, an emoji portion of an emoji-based query has more than one emoji. For example, an emoji-based query may include "☺ ♥". The system may retrieve different emoji match scores for each emoji in a query. In some embodiments, the system determines content items have different emoji match scores based on weighing each emoji of the query differently. In some embodiments, the system displays representations of content items matching a query in a different order based on weighing each emoji differently. The system may generate for display a first representation of a content item based on a first emoji having higher weight in the query. The system may then generate for display a second representation of the content item based on a second emoji having higher weight in the query. Additionally or alternatively, the system may include icons of emojis in the representations of a content item resulting from an emoji-based query. The icons of emojis are ordered based on how each emoji is weighed when the system generates an aggregate score.

In some embodiments, a system searches a database to identify portions of a content item associated with a query. Additionally or alternatively, the system may also include genres when searching a database. The system may have determined and stored genres of content items or portions of content items using the techniques described in the present disclosure. In some embodiments, the genres have been associated with emojis in emoji-based metadata. For example, the system may store an associated genre of comedy in metadata associated with a scene in "Crying Babies". The system associates the scene in "Crying Babies" with comedy based on having reaction data including 5000 ☺. In this non-limiting example, the system has received a query for " ☺ scenes". The system searches a database and identifies the scene in "Crying Babies" as a match for " ☺ scenes" based on comedy being associated with the scene.

In some embodiments, a system matches one or more emojis in a query with a content item based on statistics-based match factors stored in emoji-based metadata. In some embodiments, the system calculates an emoji match score to a content item based on quantity and/or frequency of an emoji associated with a content item. An emoji match may be calculated using various search techniques (e.g., fuzzy matching, statistical closeness, etc.). For example, the system searches for content that matches ☺. A content item has associated emoji metadata that includes a high match factor for 👍 and a high closeness factor between 👍 and ☺. Then, the system determines the content item is a good match for ☺, even though the content item is not directly associated with ☺. In some embodiments, one or more systems may substantially perform the methods described herein and display results on a remote screen (e.g., a second screen device).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for a search and recommendations engine that generates emoji-based metadata associated with content and that processes emoji-based queries using the emoji-based metadata.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, and/or any other media or multimedia and/or any combination thereof.

Figure 1:
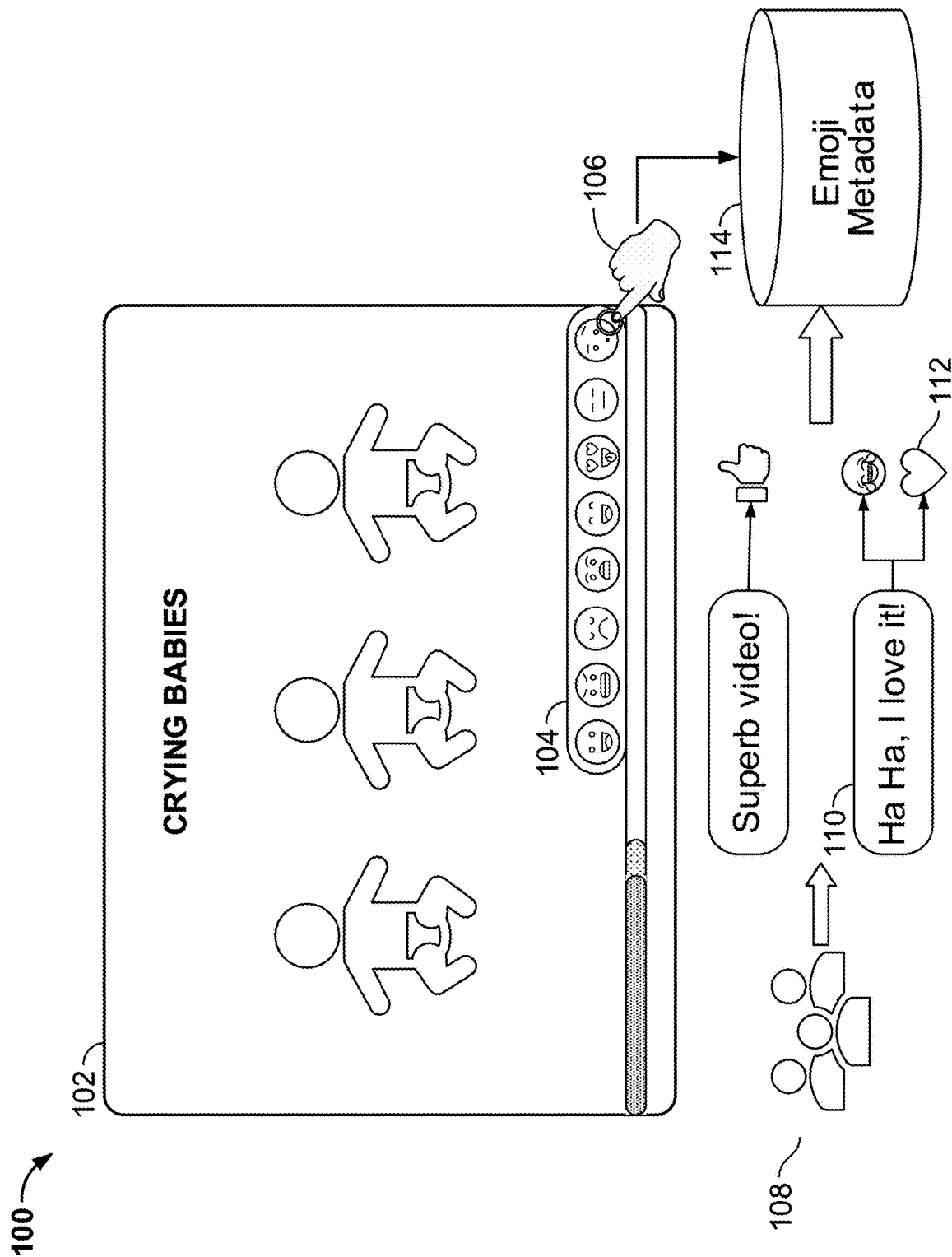
FIG. 1 shows an illustrative example of a system generating emoji-based metadata based on information about instances of reactions to content, in accordance with some embodiments of the disclosure.

FIG. 1 shows an illustrative scenario of a system generating emoji-based metadata based on information about instances of reactions to content, in accordance with some embodiments of the disclosure. System 100 retrieves content item 102 using I/O path with appropriate communications circuitry. Content item 102 includes emoji icons 104 corresponding to various reactions. One or more users interact with the emoji icons (e.g., via touch interaction 106) to indicate a reaction to content item 102. One or more users 108 may also post comments 110 about their reaction to content item 102. Control circuitry (e.g., from system 100)

maps comments 110 to various emojis 112. Reaction data including interactions (e.g., touch interaction 106) with the emoji icons and mapped emojis 112 are used by control circuitry (e.g., from system 100) to generate emoji-based metadata 114.

Content without enriched metadata may have information about reactions associated with the content. For example, a user-generated video 102 posted on social media has associated reaction data corresponding to emoji icons and/or user comments. The information about reactions can be used to generate emoji-based metadata that a system uses to search for content and recommend content. A search and recommendations system may identify one or more content items uploaded (i.e., posted) to one or more social platforms. For example, a user posted a video titled "Crying Babies" on several social platforms (e.g., Facebook, Twitter, etc.). A system identifies the video on any one or more of the social platforms. In some embodiments, the control circuitry of a system may identify a content item based on an identifier (e.g., a video title) on one or more social platforms.

A system may retrieve information about instances of a reaction to a content item. In some embodiments, the control circuitry retrieves a quantity and/or a frequency of instances of a reaction to a content item. For example, users indicated their reactions to a video titled "Crying Babies" by interaction 106 with a reaction icon 104. A reaction icon may correspond to an emoji. For example, the video titled "Crying Babies" has an emoji count of 6000 for ☺ and an emoji count of 4000 for ♥. In another non-limiting example, the video titled "Crying Babies" has an emoji frequency of 20 ☺ per second.

A system may retrieve a comment associated with a content item (e.g., via one or more I/O paths). In some embodiments, the comment has been posted on the same social platform as the content item or another social platform but associated with the content item. The control circuitry may identify a comment that is associated with a content item on the one or more social platforms. In response to identifying that the comment is associated with the content item, the system may retrieve the comment from the corresponding social platform. For example, a user posted a comment about a video titled "Crying Babies" that was uploaded to YouTube. In this example, the user posted the comment on YouTube in a comments section tied to the video. In another example, the user posted the comment on Facebook and associated the comment with the video by including a link of the video uploaded on YouTube. The system may identify the comment on Facebook as associated with "Crying Babies" based on the link and retrieve the comment from Facebook in response.

A system may map a comment to an emoji based on a rule. In some embodiments, a comment is automatically mapped to an emoji based on a rule. In some embodiments, the rule is based at least in part on sentiment analysis. Control circuitry (e.g., in system 100) may execute sentiment analysis on the comment and determine an emoji corresponding to a comment based on sentiment analysis. The control circuitry generates a mapping from the comment to the emoji. In some embodiments, one or more emojis correspond to a comment based on sentiment analysis. The control circuitry determines associated weights with the one or more emojis based on the sentiment analysis and generates a mapping based on the associated weights. For example, comment 110 associated with the video titled "Crying Babies" is "Ha Ha, I love it." System 100 executes sentiment analysis on the comment and determines that the comment corresponds to emojis 112 (i.e., ☺ and ♥). System 100 determines, based on the sentiment analysis, that the comment corresponds to a weight of 0.4 associated with ☺ and a weight of 0.6 associated with ♥. System 100 then generates a mapping from the comment to the emojis based on the associated weights.

Figure 2:
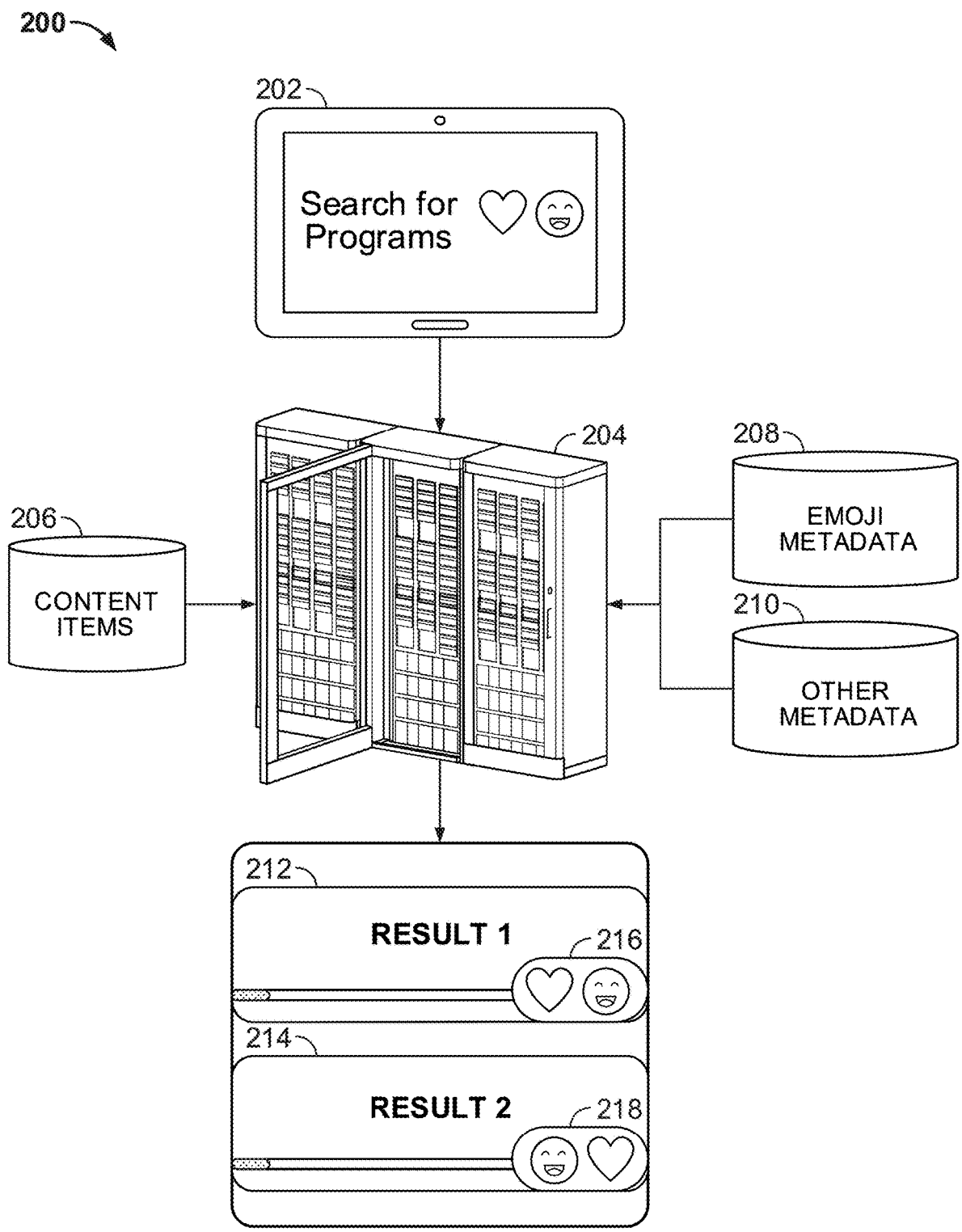
FIG. 2 shows an illustrative block diagram of a system processing an emoji-based query using emoji-based metadata to identify and display content associated with the query, in accordance with some embodiments of the disclosure.

FIG. 2 shows an illustrative scenario of a system processing an emoji-based query using emoji-based metadata to identify and display content associated with the query, in accordance with some embodiments of the disclosure. System 200 receives an emoji-based search query 202. Search and recommendations engine 204 may process search query 202. Engine 204 may identify content items 206 based on query 202 and emoji-based and/or other metadata (e.g., emoji metadata 208 and other metadata 210). Engine 204 may generate and cause to be displayed search results 212 and 214. Search results 212 and 214 are ordered based on weight of emojis 216 and 218, where emojis 216 and 218 are from emoji-based query 202.

In some embodiments, a system may process a query having one or more emojis (i.e., emoji-based query) using a match factor. Control circuitry (e.g., in system 200) receives a query including a text portion and an emoji portion. The control circuitry searches a content database to identify content items associated with the query based on the text and untranslated emoji portions. In some embodiments, the content database may include a mix of content types (e.g., movies, music, images). In some embodiments, the control circuitry may search based on the untranslated emoji portion (at least in part) by matching emojis associated with a content item. For example, system 200 receives query 202 to search for "☺ ♥ movies". System 200 searches for content items 206 associated with ☺, ♥, and movies based on metadata 208 and 210. System 200 may execute a matching algorithm (e.g., fuzzy matching) between components of the query and metadata associated with the content items (e.g., between ☺ and emoji-based metadata). System 200 may find movies that are associated with ☺ but not ♥ based on the matching algorithm and determine the movies are not a match for the query. The system finds movies that match both ☺ and ♥ based on the matching algorithm and identifies the content items as a match for the query.

In some embodiments, a system retrieves match scores associated with a content item from a database. In such embodiments, control circuitry (e.g. in system 200) retrieves an emoji match score based on an emoji portion of a query and a textual match score based on a text portion of a query. In some embodiments, the control circuitry may retrieve respective match scores for each content item of several identified content items based on the search query. For example, a user searches for "☺ ♥ movies". System 200 has identified content items associated with ☺, ♥, and movies. System 200 retrieves associated emoji and textual match scores (e.g., from metadata). Based on the associated match scores, system 200 determines certain content items are a better match for the search query relative to other content items. In some embodiments, the system may rank the content items based on the match scores. For example, a video titled "Crying Babies" has a high match score for ☺, ♥, and movies. However, a video titled "Truck Drivers" has a low match score for ♥ and movies and a high match score for ☺. Then, a system ranks "Crying Babies" first and "Truck Drivers" second in the search results based on the match score for ♥. In some embodiments, the control circuitry (e.g., in system 200) may generate an aggregate score based on associated match scores. The aggregate score is based at least in part on emoji match scores and textual match scores. For example, system 200 generates aggregate scores for "Crying Babies" and "Truck Drivers" based on the respective match scores for ☺, ♥, and movies (e.g., by summing and normalizing the match scores to the same range). Following this non-limiting example, system 200 ranks "Crying Babies" first and "Truck Drivers" second based on the aggregate scores.

Figure 3:
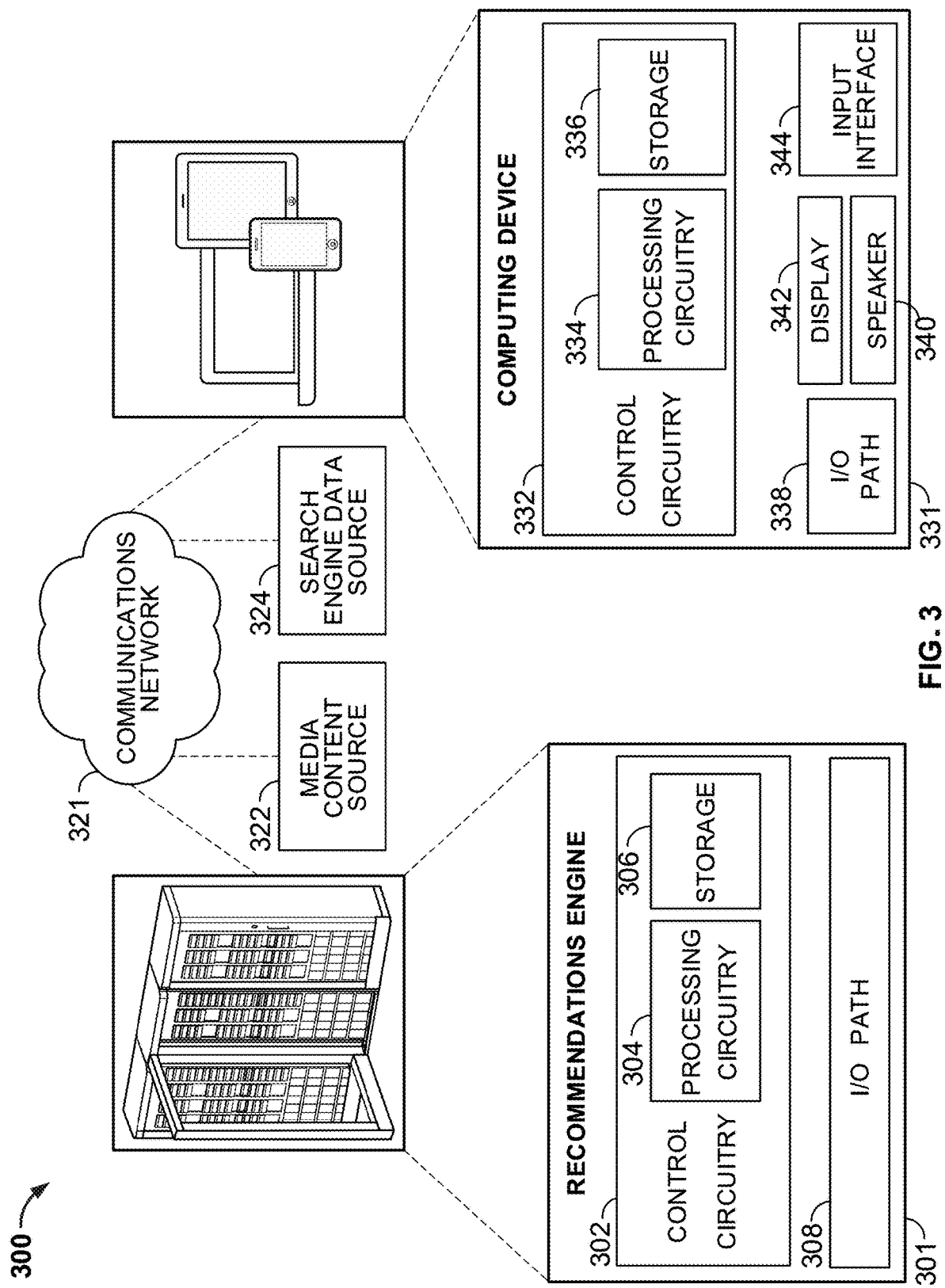
FIG. 3 shows an illustrative block diagram of a system for searching for content and providing content recommendations to a computing device, in accordance with some embodiments of the disclosure.

FIG. 3 shows an illustrative block diagram of a system 300 for searching for content and providing content recommendations to a computing device, in accordance with some embodiments of the disclosure. System 300 may, in some embodiments, further represent system 100 and/or system 200. Although FIG. 3 shows system 300 as including a number and configuration of individual components, in some embodiments, any number of the components of system 300 may be combined and/or integrated as one device. System 300 includes recommendations engine 301, which may be a server, as well as communications network 321, computing device 331, media content source 322, and search engine data source 324. Recommendations engine 301 is communicatively coupled to computing device 331, media content source 322, and search engine data source 324 by way of communications network 321, which may include the Internet and/or any other suitable wired and/or wireless communications paths, networks and/or groups of networks. Recommendations engine 301 may include a search engine and/or be able to substantially perform the functions of a search and recommendations engine as described in the present disclosure.

In some embodiments, system 300 excludes recommendations engine 301, and functionality that would otherwise be implemented by recommendations engine 301 is instead implemented by other components of system 300, such as computing device 331. In other embodiments, recommendations engine 301 works in conjunction with computing device 331 to implement certain functionality described herein in a distributed or cooperative manner.

Recommendations engine 301 includes control circuitry 302 and input/output (hereinafter "I/O") path 308, and control circuitry 302 includes storage 306 and processing circuitry 304. Computing device 331 includes control circuitry 332, I/O path 338, speaker 340, display 342, and user input interface 344. Control circuitry 332 includes storage 336 and processing circuitry 334. Control circuitry 302 and/or 332 may be based on any suitable processing circuitry such as processing circuitry 304 and/or 334. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 306, storage 336, and/or storages of other components of system 300 (e.g., storages of media content source 322, search engine data source 324, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 306, storage 336, and/or storages of other components of system 300 may be used to store various types of content, metadata, and or other types of data. Non-volatile memory may also be used (e.g., to launch a boot-up routine and other instructions). Cloud-based storage may be used to supplement storages 306, 336 or instead of storages 306, 336. In some embodiments, control circuitry 302 and/or 332 executes instructions for an application stored in memory (e.g., storage 306 and/or 336). Specifically, control circuitry 302 and/or 332 may be instructed by the application to perform the functions discussed herein. In some implementations, any action performed by control circuitry 302 and/or 332 may be based on instructions received from the application. For example, the application may be implemented as software or a set of executable instructions that may be stored in storage 306 and/or 336 and executed by control circuitry 302 and/or 332. In some embodiments, the application may be a client/server application where only a client application resides on computing device 331 and a server application resides on recommendations engine 301.

The application may be implemented using any suitable architecture. For example, it may be a stand-alone application wholly implemented on computing device 331. In such an approach, instructions for the application are stored locally (e.g., in storage 336), and data for use by the application is downloaded on a periodic basis (e.g., from an out-of-band feed, from an Internet resource, or using another suitable approach). Control circuitry 332 may retrieve instructions for the application from storage 336 and process the instructions to perform the functionality described herein. Based on the processed instructions, control circuitry 332 may determine what action to perform when input is received from user input interface 344.

In client/server-based embodiments, control circuitry 332 may include communications circuitry suitable for communicating with an application server (e.g., recommendations engine 301) or other networks or servers. The instructions for carrying out the functionality described herein may be stored on the application server. Communications circuitry may include a cable modem, an Ethernet card, or a wireless modem for communication with other equipment, or any other suitable communications circuitry. Such communications may involve the Internet or any other suitable communications networks or paths (e.g., communications network 321). In another example of a client/server-based application, control circuitry 332 runs a web browser that interprets web pages provided by a remote server (e.g., recommendations engine 301). For example, the remote server may store the instructions for the application in a storage device. The remote server may process the stored instructions using circuitry (e.g., control circuitry 302) and/or generate displays. Computing device 331 may receive the displays generated by the remote server and may display the content of the displays locally via display 342. This way, the processing of the instructions is performed remotely (e.g., by recommendations engine 301) while the resulting displays, such as the display windows described elsewhere herein, are provided locally on computing device 331. Computing device 331 may receive inputs from the user via input interface 344 and transmit those inputs to the remote server for processing and generating the corresponding displays.

A user may send instructions to control circuitry 302 and/or 332 using user input interface 344. User input interface 344 may be any suitable user interface, such as a remote control, trackball, keypad, keyboard, touchscreen, touchpad, stylus, joystick, voice recognition interface, gaming controller, or other user input interfaces. User input interface 344 may be integrated with or combined with display 342, respectively, which may be a monitor, a television, a liquid crystal display (LCD), an electronic ink display, or any other equipment suitable for displaying visual images.

Recommendations engine 301 and computing devices 331 may transmit and receive content and data via one or more of I/O paths 308 and 338. I/O paths 308 and 338 may be or include appropriate communications circuitry. For instance, I/O path 308 and/or I/O path 338 may include a communications port configured to transmit and/or receive (for instance to and/or from media content source 322 and/or search engine data source 324), via communications network 321, content item identifiers, natural language queries, and/or other data. Control circuitry 302, 332 may be used to send and receive commands, requests, and other suitable data using I/O paths 308, 338.

Figure 4:
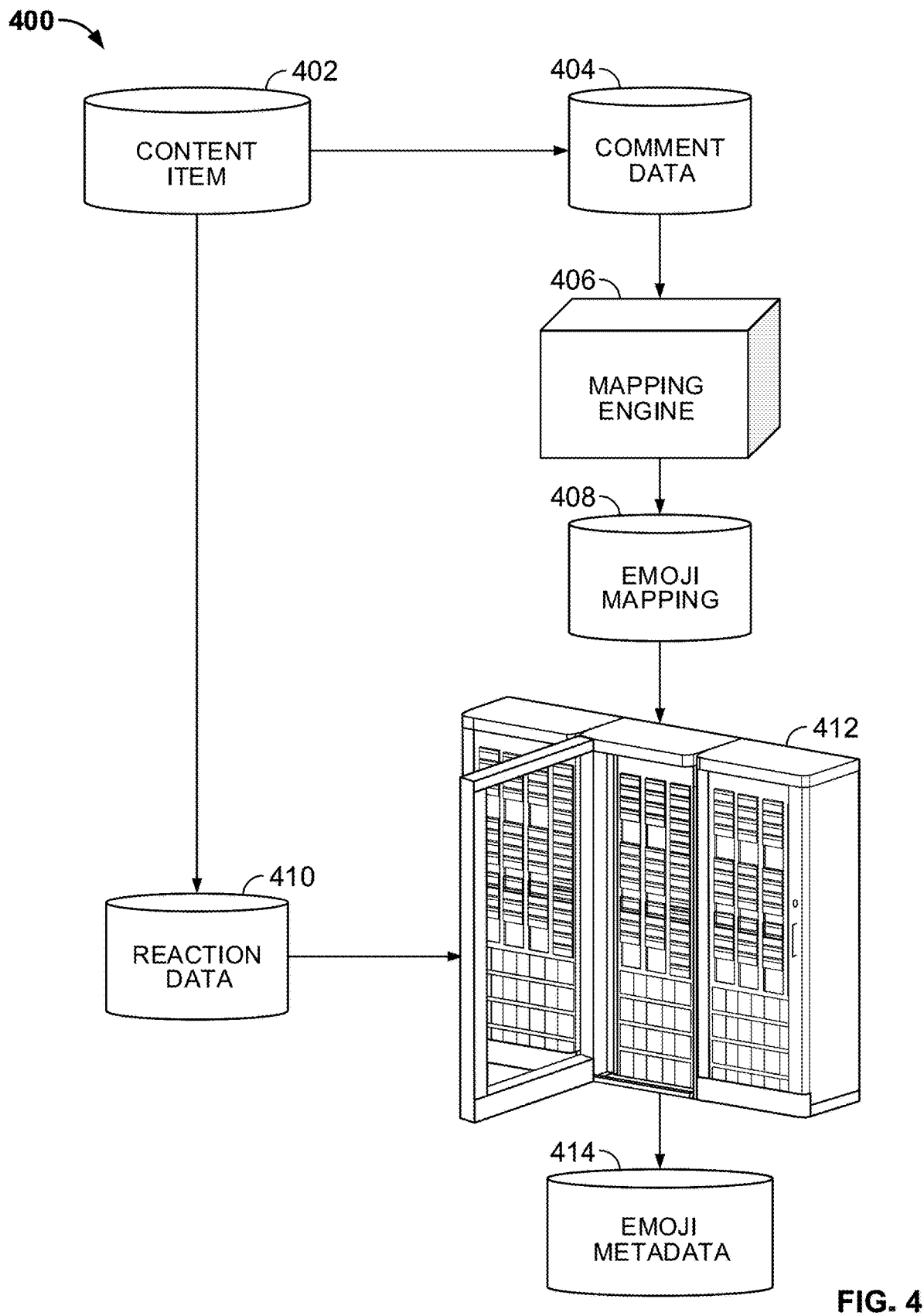
FIG. 4 shows an illustrative block diagram of a system generating emoji-based metadata for content based on information about reactions and comments associated with the content, in accordance with some embodiments of the disclosure.

FIG. 4 shows an illustrative block diagram of a system generating emoji-based metadata for content based on information about reactions and comments associated with the content, in accordance with some embodiments of the disclosure. System 400 retrieves content item 402 (e.g., using communications network 321 from content source 322). Content item 402 includes comment data 404 and reaction data 410. Comment data 404 is processed by mapping engine 406 (e.g., using control circuitry). Mapping engine 406 maps comments in comment data 404 to various emojis to indicate associated reactions. Mapping engine 406 generates emoji mapping 408 based on the comments. Search and recommendations engine 412 receives emoji mapping 408 and reaction data 410. Reaction data 410 includes interactions with emoji icons to indicate reactions to content item 402. Search and recommendations engine 412 generates (e.g., using control circuitry 302) emoji-based metadata 414 based on reaction data 410 and emoji mapping 408.

A system may generate a factor (e.g., using control circuitry 302) associated with a content item and an emoji. In some embodiments, the control circuitry generates a factor based on information about instances of a reaction associated with a content item and based on mapping of a comment associated with a content item to an emoji. In some embodiments, the control circuitry generates emoji-based metadata based on the factor and the emoji. The control circuitry may generate a factor associated with a content item and an emoji based on frequency of instances of a reaction associated with a content item. In some embodiments, the control circuitry generates a closeness factor to an emoji for approximate matching techniques (e.g., fuzzy matching). For example, if a content item matches ☺, system 400 also generates (e.g., by way of control circuitry 302) high closeness factors to some emojis (e.g., ☖, ☗) and low closeness factors to others (e.g., ☹). In some embodiments, the control circuitry may generate match factors associated with an emoji that is associated with an opposite reaction (i.e., a low closeness factor). For example, system 400 generates a high match factor for ☺ and a low match factor for ☹ at the same time based on reaction data and closeness factors. In some embodiments, the control circuitry may generate a statistics-based match factor associated with a content item and an emoji. The statistical match factor is based on information about instances of a reaction associated with a content item. For example, a video titled "Crying Babies" has various associated reaction data (e.g., count, frequency, associated emoji types, distribution, etc.). System 400 generates statistical data based on the reaction data (e.g., average count, average frequency, variance, skew, etc.). System 400 generates the emoji match factor based on the statistical data (e.g., based on average frequency).

A system may store a factor associated with a content item and an emoji (e.g., in storage 306 using control circuitry 302). In some embodiments, the control circuitry stores the factor in a database in association with an identifier of the content item. For example, a system has generated a match factor based on information about reactions to a video titled "Crying Babies". The system stores the match factor in a data structure associated with the title identifier "Crying Babies". The match factor may facilitate processing of an emoji-based query.

Figure 5:
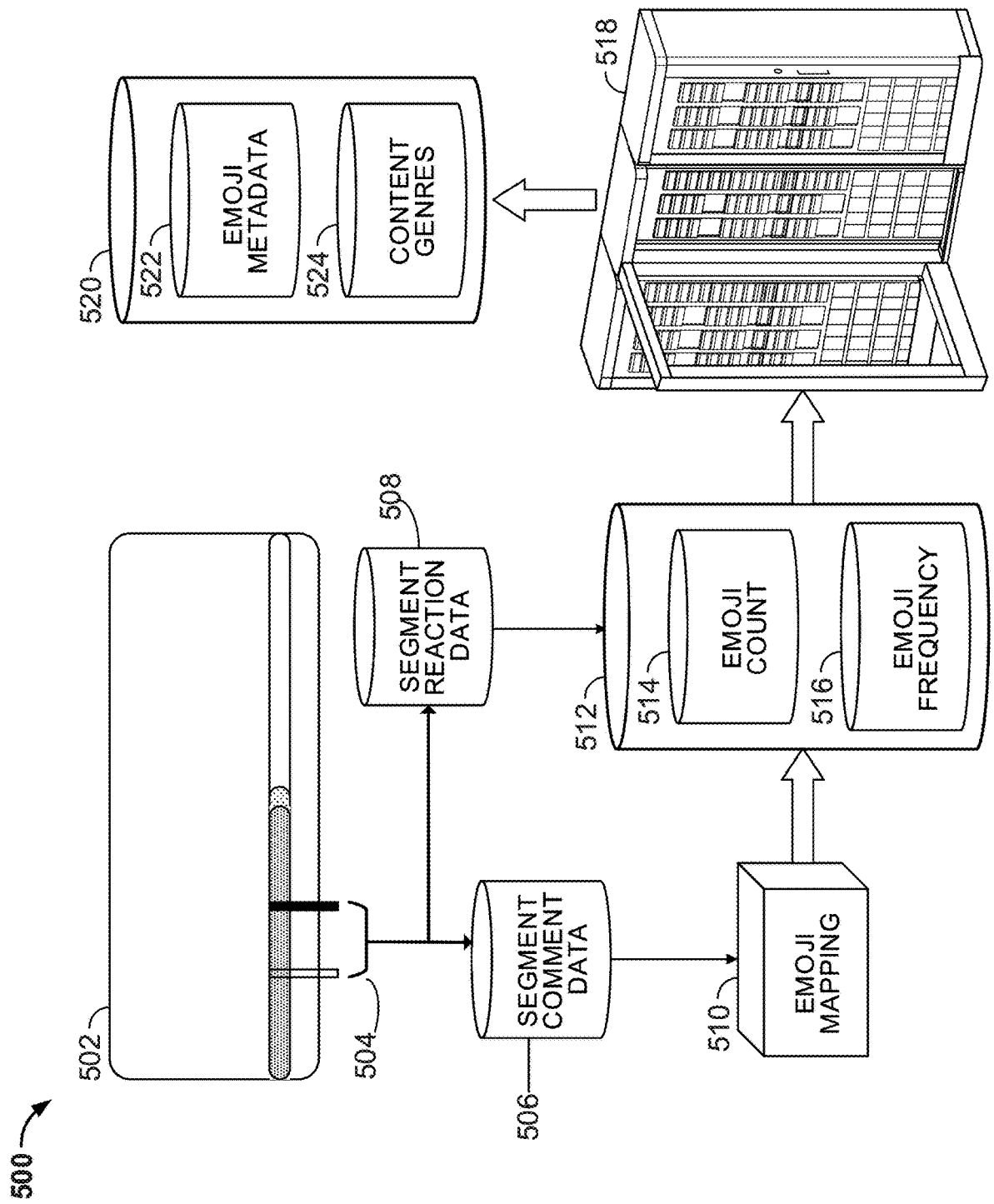
FIG. 5 shows an illustrative block diagram of a system generating emoji-based metadata for portions of content items based on information about reactions and comments associated with the portions of content items, in accordance with some embodiments of the disclosure.

FIG. 5 shows an illustrative block diagram of a system generating emoji-based metadata for portions of content items based on information about reactions and comments associated with the portions of content items, in accordance with some embodiments of the disclosure. System 500 receives content item 502 including portion 504 (e.g., via communications network 321). System 500 receives portion comment data 506 associated with portion 504. Emoji mapping generator 510 uses portion comment data 506 to map the comments to various emojis. Control circuitry (e.g., control circuitry 302) combines the emoji mappings from mapping generator 510 with portion reaction data 508 associated with portion 504 into statistical data 512. Statistical data 512 includes emoji count data 514 and emoji frequency data 516. Search and recommendations engine 518 receives and processes statistical data 512 to generate emoji-based metadata 520 about portion 504 (e.g., using control circuitry 302). Metadata 520 includes emoji metadata 522 and associated content genres 524 based on statistical data 512.

A content item may include one or more portions. For example, a video titled "Crying Babies" includes three portions (i.e., scenes in the video). Control circuitry (e.g, from system 500) may determine quantities of instances of a reaction associated with each portion based on information about instances of a reaction associated with a content item. The control circuitry maps one or more emojis to each portion based on a rule as previously described in the present disclosure. The control circuitry generates and associates a factor with each portion based on information about instances of a reaction associated with a content item. In some embodiments, the control circuitry may determine a genre of a portion of a content item. The control circuitry associates a factor with the genre of a portion. For example, system 500 determines a scene in a video titled "Crying Babies" is associated with ☺. Accordingly, system 500 determines the scene is associated with comedy or a related genre and associates a match factor with the scene genre.

Figure 6:
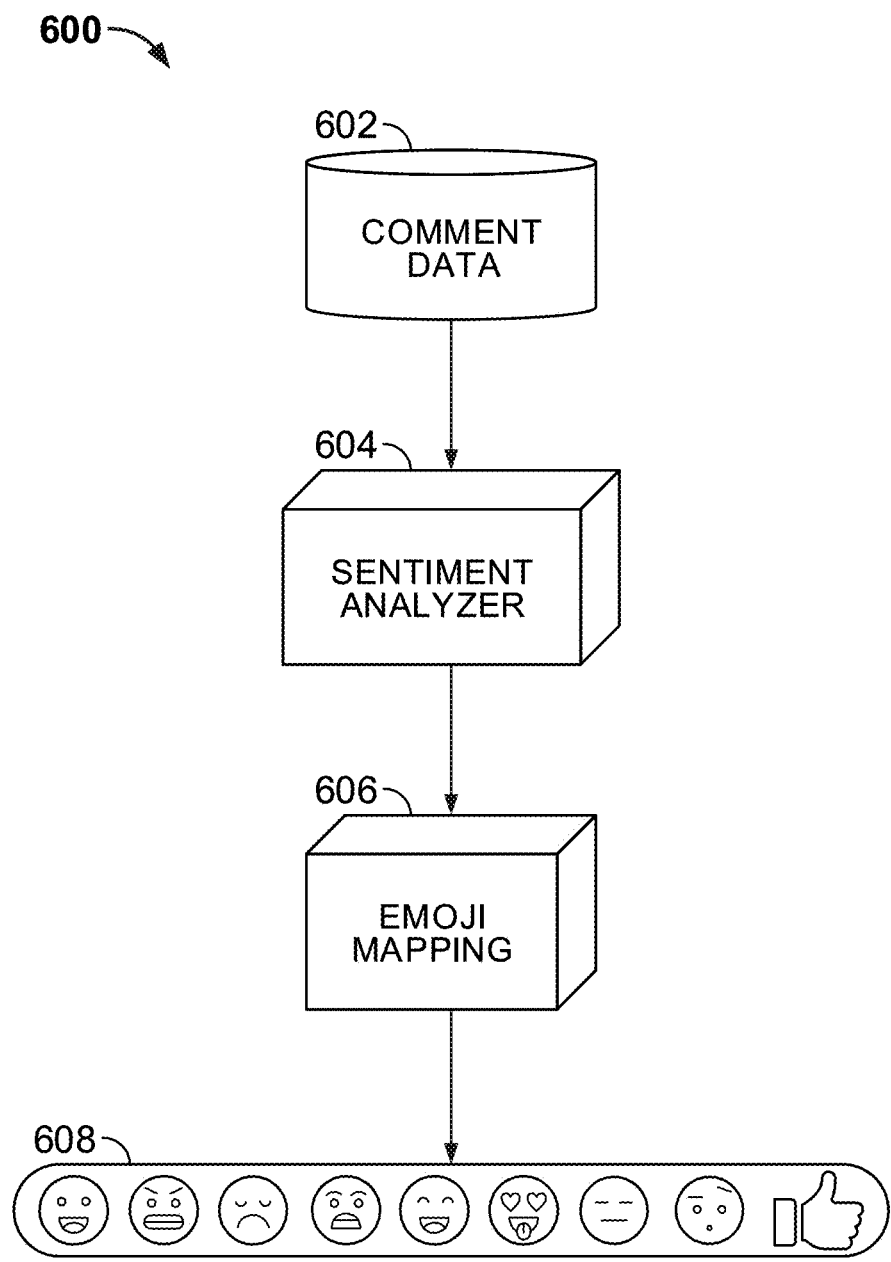
FIG. 6 shows an illustrative block diagram of a system mapping comment data to emojis, in accordance with some embodiments of the disclosure.

FIG. 6 shows an illustrative block diagram of a system mapping comment data to emojis, in accordance with some embodiments of the disclosure. System 600 may be a mapping engine (e.g., mapping engine 406). System 600 receives comment data 602 associated with one or more content items. Sentiment analyzer 604 processes comment data 602 using sentiment analysis and provides the analysis results to emoji mapping generator 606. Emoji mapping generator 606, based on the results of the sentiment analysis, generates mappings between comment data 602 and one or more emojis. Emoji group 608 provides some example emojis, which may represent reactions based on comment data 602.

Figure 7:
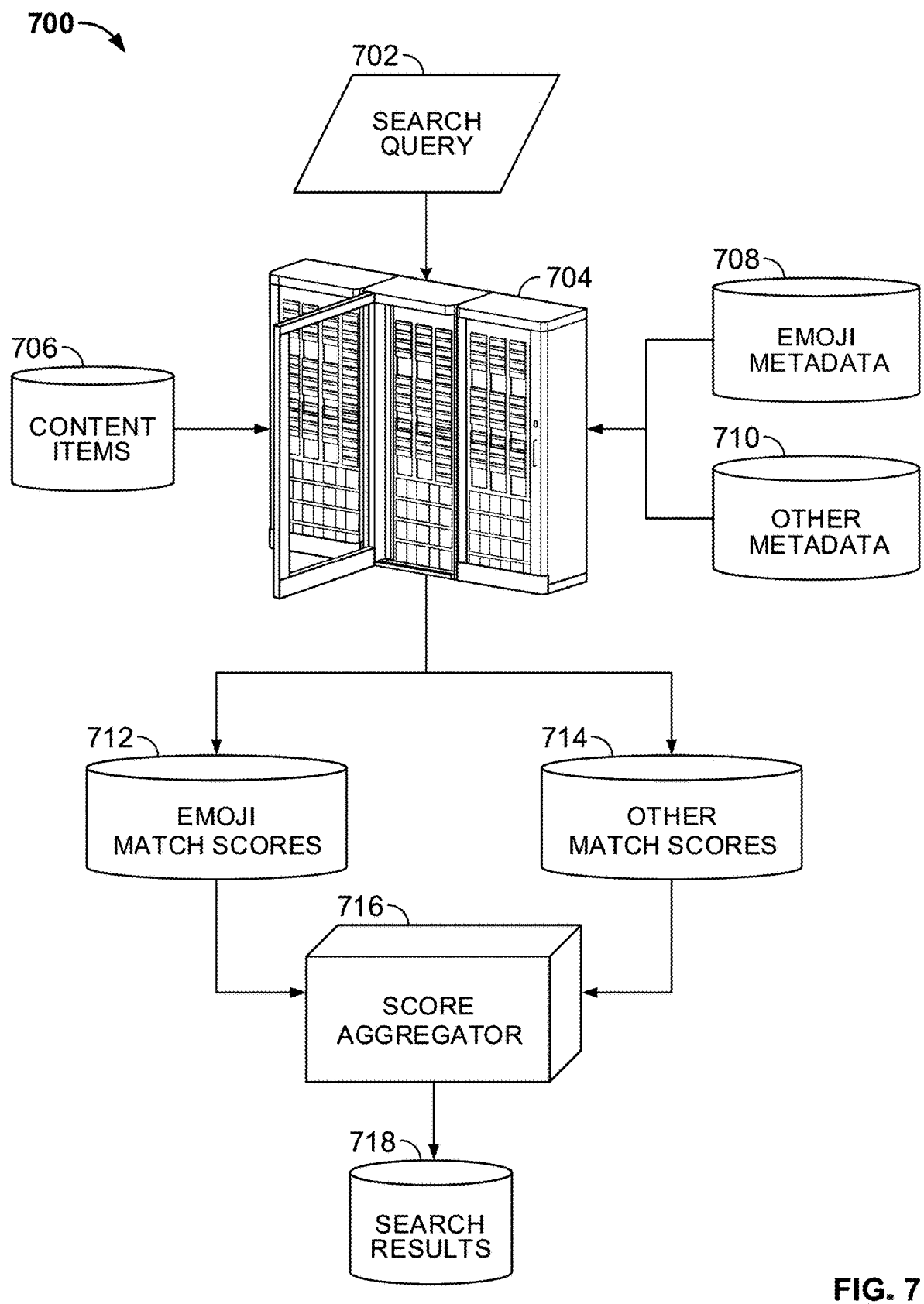
FIG. 7 shows an illustrative block diagram of a system processing an emoji-based search query for content, in accordance with some embodiments of the disclosure.

FIG. 7 shows an illustrative block diagram of a system processing an emoji-based search query for content, in accordance with some embodiments of the disclosure. System 700 receives emoji-based search query 702, which includes an emoji portion and a textual portion. Search and recommendations engine 704 receives (e.g., using I/O path 308 and appropriate circuitry) and processes emoji-based search query 702 (e.g., using control circuitry 302). The control circuitry from search and recommendations engine 704 searches a content database (e.g., content source 322) and identifies content items 706 matching query 702 based on emoji-based metadata and/or other metadata (e.g., emoji metadata 708 and other metadata 710). The control circuitry retrieves emoji match scores 712 based on the emoji portion and other match scores 714 based on the textual portion (e.g., from metadata 708 and 710). Score aggregator 716 receives scores 712 and 714 and generates respective aggregate scores for the identified content items 706. System 700 generates search results data 718, where the search results are ranked based on the aggregate scores. System 700 may display search results data 718 or cause search results data 718 to be displayed on another device (e.g., on computing device 331).

In some embodiments, a system searches a database to identify portions of a content item associated with a query. Additionally or alternatively, the system may also include genres when searching a database. A system may have determined and stored genres of content items or portions of content items using the techniques described in the present disclosure. In some embodiments, the genres have been associated with emojis in emoji-based metadata. For example, system 500 stored an associated genre of comedy for "Crying Babies" in metadata. System 500 associated the scene in "Crying Babies" with comedy based on the reaction data (e.g., an emoji count of 5000 ☺ ). System 700 receives a query for " ☺ scenes". System 700 searches a database using a search engine and identifies, using control circuitry, the scene in "Crying Babies" as a match for " ☺ scenes" based on comedy being associated with the scene.

In some embodiments, control circuitry in a system matches one or more emojis in a query with a content item based on statistics-based match factors stored in emoji-based metadata. In some embodiments, the control circuitry calculates an emoji match score to a content item based on quantity and/or frequency of an emoji associated with a content item. An emoji match may be calculated using various search techniques (e.g., fuzzy matching, statistical closeness, etc.). For example, system 700 searches for content that matches ☺ using a search engine. A content item has associated emoji metadata that includes a high match factor for ☻ and a high closeness factor between ☻ and ☺. Then, system 700 determines the content item is a good match for ☺, even though the content item is not directly associated with ☺. In some embodiments, one or more systems may substantially perform the methods described herein and display results on a remote screen (e.g., display 342 on computing device 331 using communications network 321). In some embodiments, an aggregate match score may be calculated based on an emoji-based metadata match factor and a textual match factor (e.g., using control circuitry 302). The match factors may contribute differently to the match score. As a non-limiting example, a search query may be " ☺ programs". An emoji match factor for ☺ is denoted "E" and a match factor including all other match factors (e.g., textual match factor for programs) is denoted "O". The weights of each match factor may be denoted "a" and "b", respectively. In this example, the aggregate match score "P" is calculated by $$P=a*E+b*O.$$

Further to this example, an emoji portion is also translated into a text string (e.g., comedy). The translated emoji match factor for comedy is denoted "T" with associated weight denoted "c". In this example, the weights "a", "b", and "c" sum to one. Then, a second aggregate match score "S" may be calculated by $$S=P+c*T=a*E+b*O+c*T.$$

Figure 8:
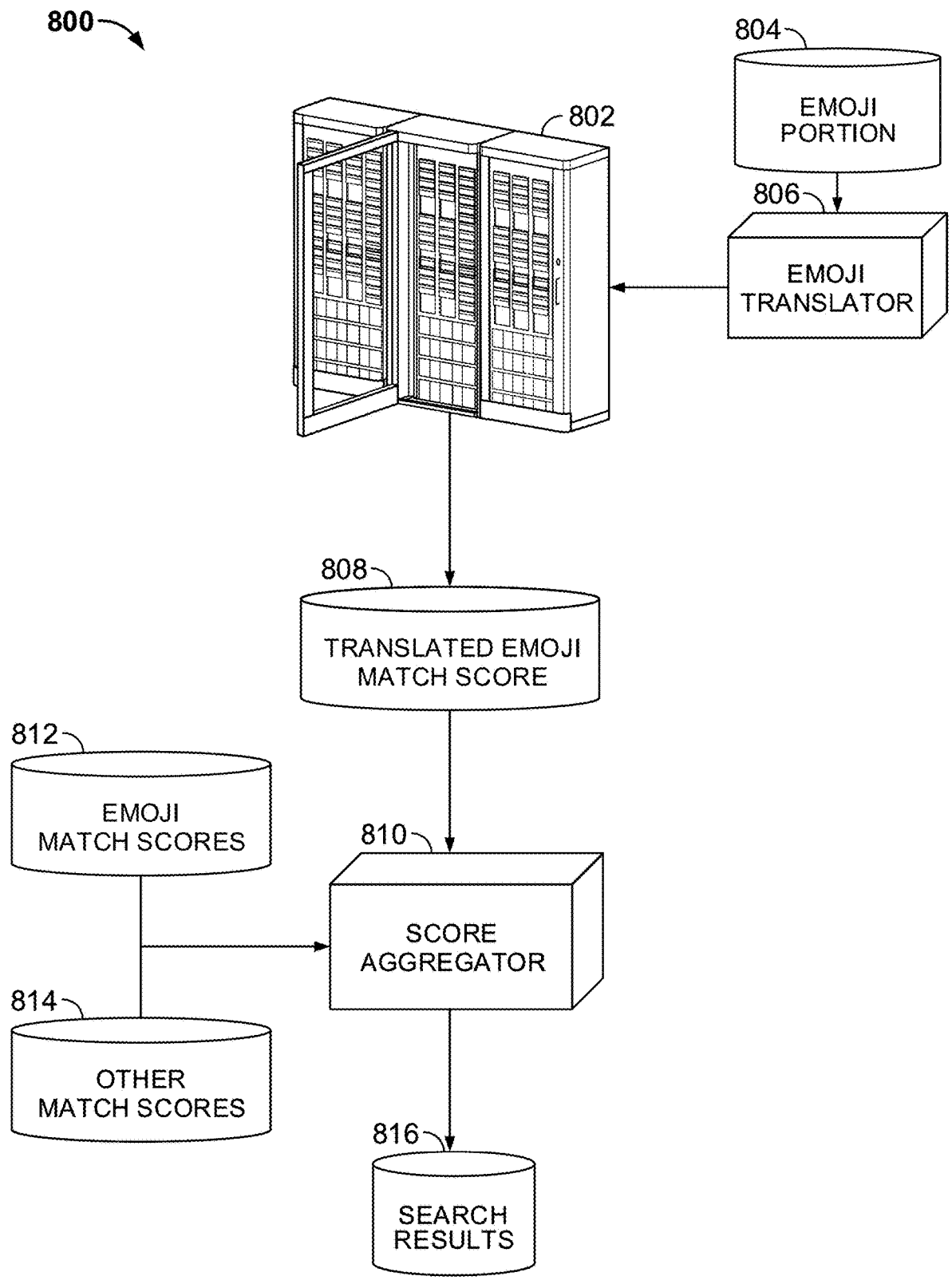
FIG. 8 shows an illustrative block diagram of a system for generating aggregate scores based on an untranslated emoji-based search query and a translated emoji-based search query, in accordance with some embodiments of the disclosure.

FIG. 8 shows an illustrative block diagram of a system for generating aggregate scores based on an untranslated emoji-based search query and a translated emoji-based search query, in accordance with some embodiments of the disclosure. System 800 includes search and recommendations engine 802 and emoji translator 806. Emoji translator 806 receives emoji portion 804 of a search query (e.g., search query 702). Emoji translator 806 translates (e.g., using control circuitry 302) the emoji portion into a text string for processing by search and recommendations engine 802. Engine 802 retrieves translated emoji match score 808 for the translated emoji portion (e.g., from other metadata 710). Score aggregator 810 generates aggregate scores based on emoji match scores 812, other match scores 814, and translated emoji match scores 808. Previous aggregate scores based on emoji match scores 812 and other match scores 814 may have been generated (e.g., by system 700). Score aggregator 810 may then generate aggregate scores based on the previous aggregate scores and translated emoji match scores 808. System 800 generates search results data 816, which are ordered based on the aggregate scores. Search results data 816 may be used to generate for display representations of the search results (e.g., by system 900 as described in FIG. 9).

In some embodiments, a system translates an emoji portion of an emoji-based query into text. Control circuitry from the system retrieves a second textual match score based on the translated emoji portion for a content item. The control circuitry generates a second aggregate score for a content item based on the first aggregate score and the second textual match score. In some embodiments, the control circuitry may retrieve respective textual match scores for one or more content items based on the translated emoji portion in order to generate respective second aggregate scores for each content item as described herein. In some embodiments, the first aggregate score and translated emoji portion may contribute differently to the second aggregate score. For example, system 800 translates ☺ as a text string, "comedy". System 800 retrieves different match scores for ☺ and "comedy" for a video titled "Truck Drivers" from associated metadata. System 800 retrieves a match score for ☺ from emoji-based metadata and a match score for comedy from other metadata. System 800 may generate a more accurate aggregate match score for "Truck Drivers" after including the translated emoji portion.

Figure 9:
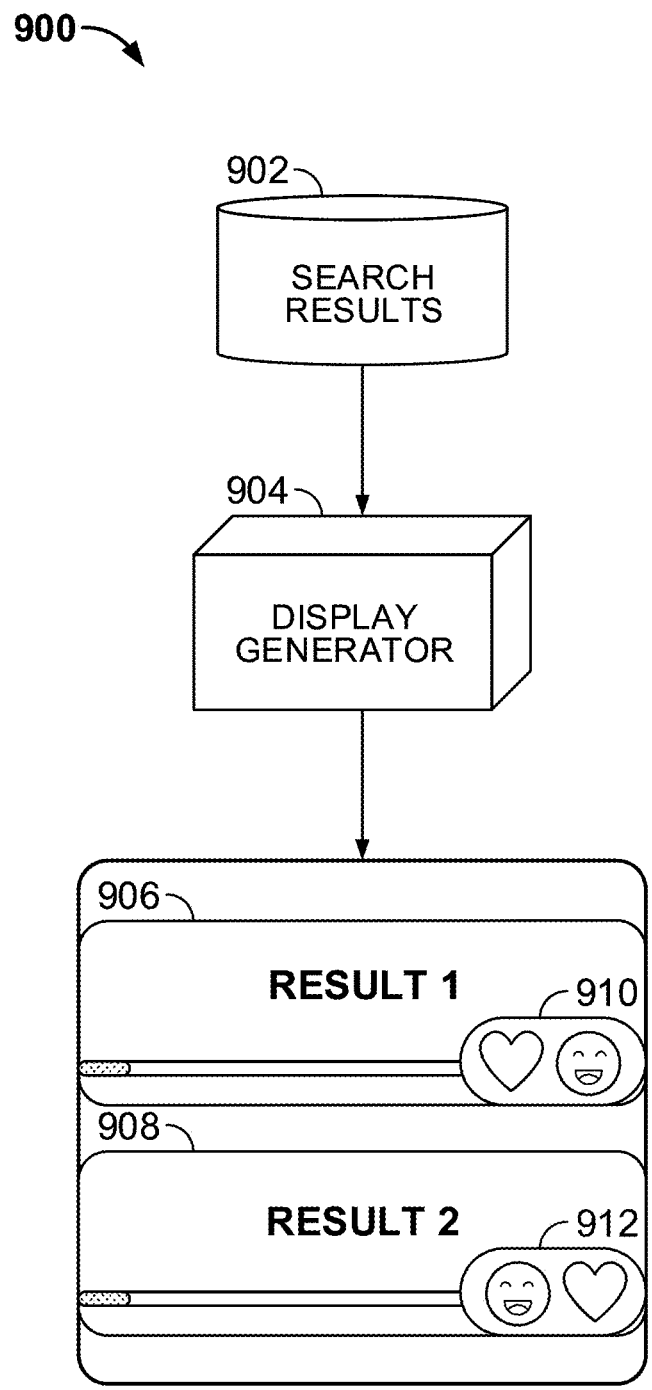
FIG. 9 shows an illustrative block diagram of a system for displaying emoji-based search results, in accordance with some embodiments of the disclosure.

FIG. 9 shows an illustrative block diagram of a system for displaying emoji-based search results, in accordance with some embodiments of the disclosure. System 900 receives search results data 902. For example, search results data 902 may be search results data 718 and/or search results data 816. Display generator 904 generates for display (e.g., using display circuitry as instructed by control circuitry 302) representations of the search results based on search results data 902. Search results data 902 may include a ranking of the search results based on the aggregate scores (e.g., as described in relation to FIGS. 7 and 8). Display generator 904 generates for display the representations 906 and 908 (e.g., a short clip for each video result). Display generator 904 may generate emoji icons 910 and 912, which may indicate how each emoji was weighed when searching for the content items. For example, emoji icons 910 indicate ♥ had higher weight than ☺ in result 906. For example, emoji icons 912 indicate ☺ had higher weight than ♥ in result 908.

In some embodiments, a system generates for display or causes to be displayed representations of the content items. In some embodiments, control circuitry from the system may cause to be displayed the representations on a remote device different from the system (e.g., on display 342). In some embodiments, the control circuitry may order the representations of the content items according to the respective aggregate scores. In some embodiments, representations of the content items include portions of the content items. For example, a search query of "☺ ♥ movies" results in the videos "Crying Babies" and "Truck Drivers". System 900 displays thumbnails of search results 906 and 908 as representations for the results. In another non-limiting example, system 900 displays short clips of search results 906 and 908 to represent the results.

In some embodiments, an emoji portion of an emoji-based query has more than one emoji. For example, an emoji-based query includes "☺ ♥". A system may retrieve different emoji match scores for each emoji in a query. In some embodiments, control circuitry in the system determines content items have different emoji match scores based on weighing each emoji of the query differently. In some embodiments, a system displays representations of content items matching a query in a different order based on weighing each emoji differently. Additionally or alternatively, the system may display icons of emojis in the representations of a content item resulting from an emoji-based query. For example, system 900 may generate for display search result 906 with emoji icons 910 in which ♥ had higher weight. System 900 may then generate for display search result 908 with emoji icons 912 in which ☺ had higher weight.

Figure 10:
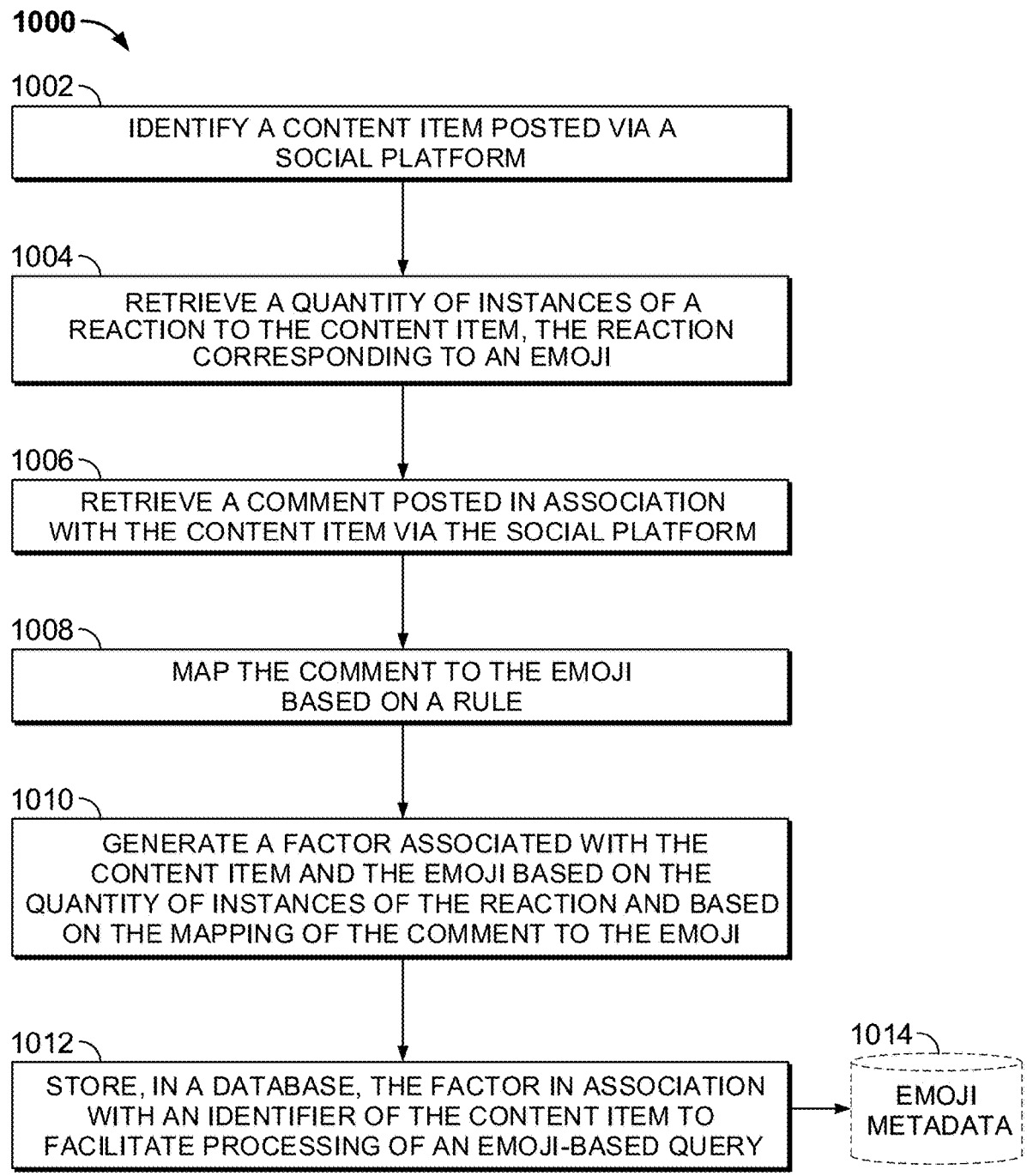
FIG. 10 shows a flowchart of a process for generating emoji-based metadata associated with content, in accordance with some embodiments of the disclosure.

FIG. 10 shows a flowchart of a process 1000 for generating emoji-based metadata associated with content, in accordance with some embodiments of the disclosure. Process 1000, and any of the following processes, may be executed by control circuitry (e.g., control circuitry 302). The control circuitry may be part of a recommendations engine or a search engine or may be part of a remote server separate from the recommendations engine by way of a communications network or distributed over a combination of both. A system (e.g., system 200) may perform process 1000 as described herein. At 1002, a content item that was posted to a social platform is identified. The content item may have been posted to more than one social platform. Control circuitry in a system (e.g., system 400) may identify the content item based on any one of the social platforms. At 1004, a quantity of instances of a reaction to the content item is retrieved. The reaction corresponds to an emoji. The system may retrieve the quantity of instances (i.e., an emoji count) using control circuitry and/or communications circuitry (e.g., control circuitry 302 and/or I/O path 308). At 1006, a comment is retrieved. The comment is posted in association with the content item via the social platform. In some embodiments, the comment may have been posted on a different social platform from the social platform where the content item was posted, but the comment is associated with the content item (e.g., by including a hyperlink to the content item). Control circuitry may retrieve the comment in response to determining the comment is associated with the content item. At 1008, the comment is mapped to the emoji based on a rule. The rule may be based at least in part on sentiment analysis. Control circuitry may execute the sentiment analysis and generate a mapping between the comment and the emoji based on the sentiment analysis. At 1010, a factor is generated. The factor is associated with the content item and the emoji based on the quantity of instances of the reaction and based on the mapping between the comment and the emoji. At 1012, the factor is stored in a database in association with an identifier of the content item (e.g., in a data structure associated with a title of the content item). The factor may be stored in emoji-based metadata 1014. The stored factor may be used by a system (e.g., system 700) to facilitate processing of an emoji-based query.

Figure 11:
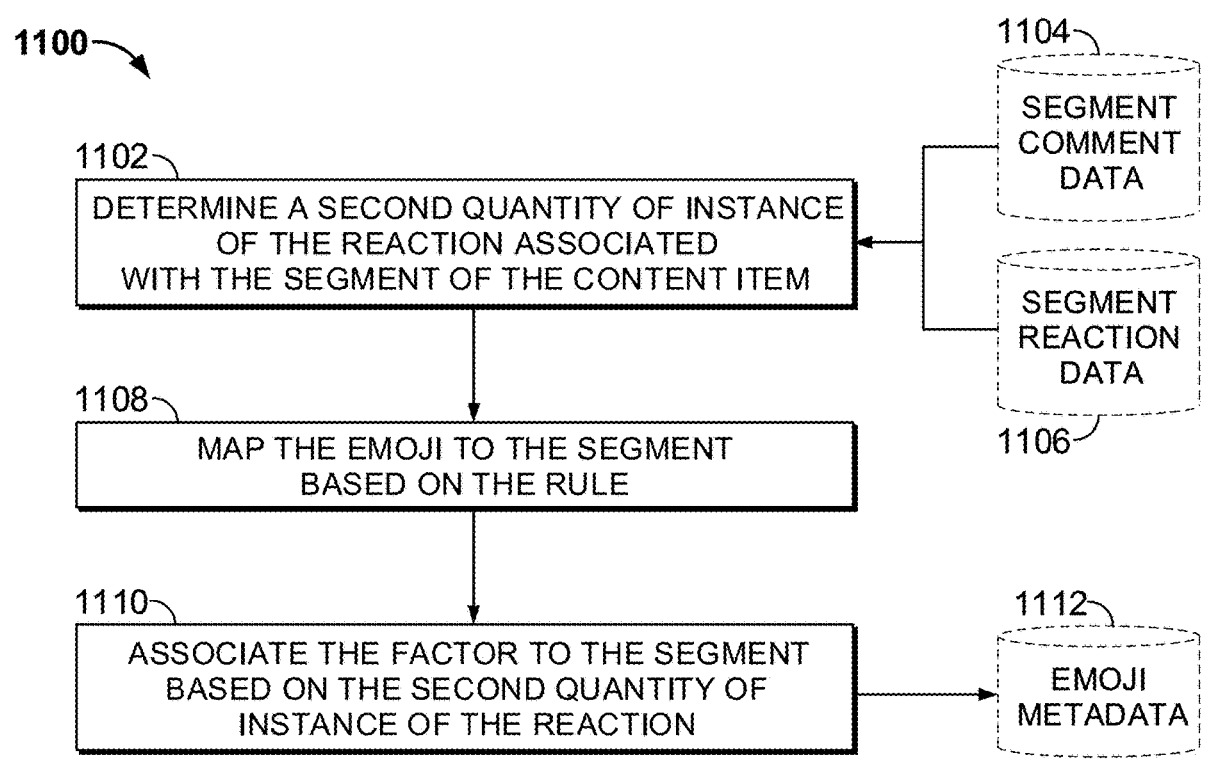
FIG. 11 shows a flowchart of a process for mapping emojis to portions of content items to include in emoji-based metadata, in accordance with some embodiments of the disclosure.

FIG. 11 shows a flowchart of a process for mapping emojis to portions of content to include in emoji-based metadata, in accordance with some embodiments of the disclosure. Process 1100 may be performed by a system (e.g., system 500) in addition to (or as part of) process 1000. At 1102, a second quantity of instances of a reaction is determined (e.g., using control circuitry 302) based on portion comment data 1104 and portion reaction data 1106. The second quantity is associated with a portion of the content item. At 1108, the emoji is mapped to the portion (e.g., by system 600) based on the rule (e.g., sentiment analysis). At 1110, the factor is associated with the portion based on the second quantity of instances of the reaction prior to storing the factor in a database. For example, system 400 generates the factor and associates the factor with the portion before storing the factor in a database including emoji-based metadata 1112.

Figure 12:
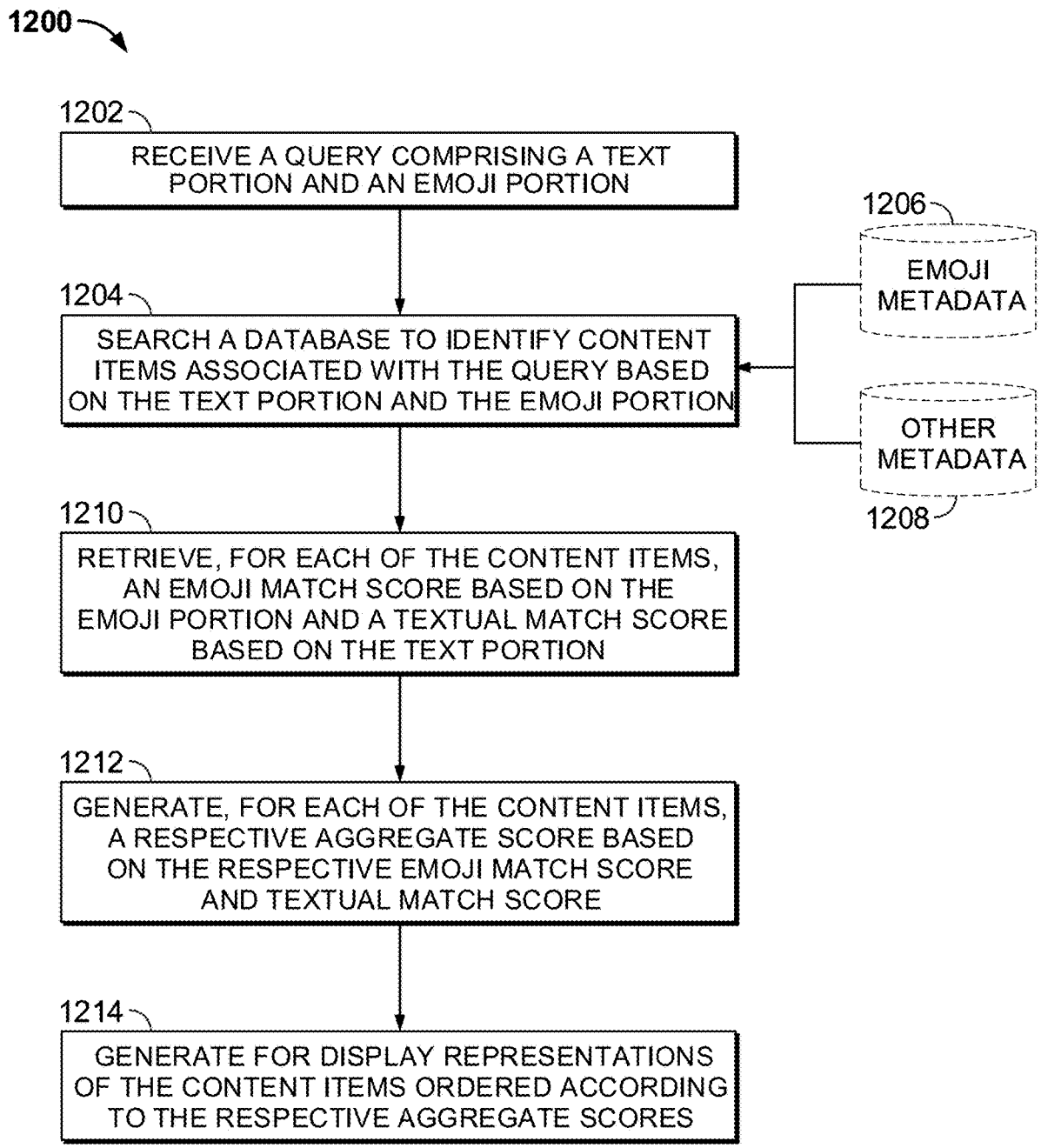
FIG. 12 shows a flowchart of a process for processing an emoji-based search query for content, in accordance with some embodiments of the disclosure.

FIG. 12 shows a flowchart of a process for processing an emoji-based search query for content, in accordance with some embodiments of the disclosure. At 1202, an emoji-based search query is received. The query includes a text portion and an emoji portion. At 1204, a system searches (e.g., using control circuitry 302) a database (e.g., search engine data source 324 and/or content source 322) for content items associated with the query (e.g., based on emoji metadata 1206 and other metadata 1208). The control circuitry may search for content items based at least in part on matching emojis from the emoji portion to the content items (e.g., by matching emojis to associated emoji metadata 1206 of content items using control circuitry 302). At 1210, match scores are retrieved for each content item identified from searching the database. The match scores include an emoji match score based on the emoji portion and a textual match score based on the text portion of the query. At 1212, an aggregate score for each identified content item is generated based on the respective emoji match score and textual match score. For example, system 700 generates aggregate scores using score aggregator 716. The respective aggregate score may be a first aggregate score.

Figure 13:
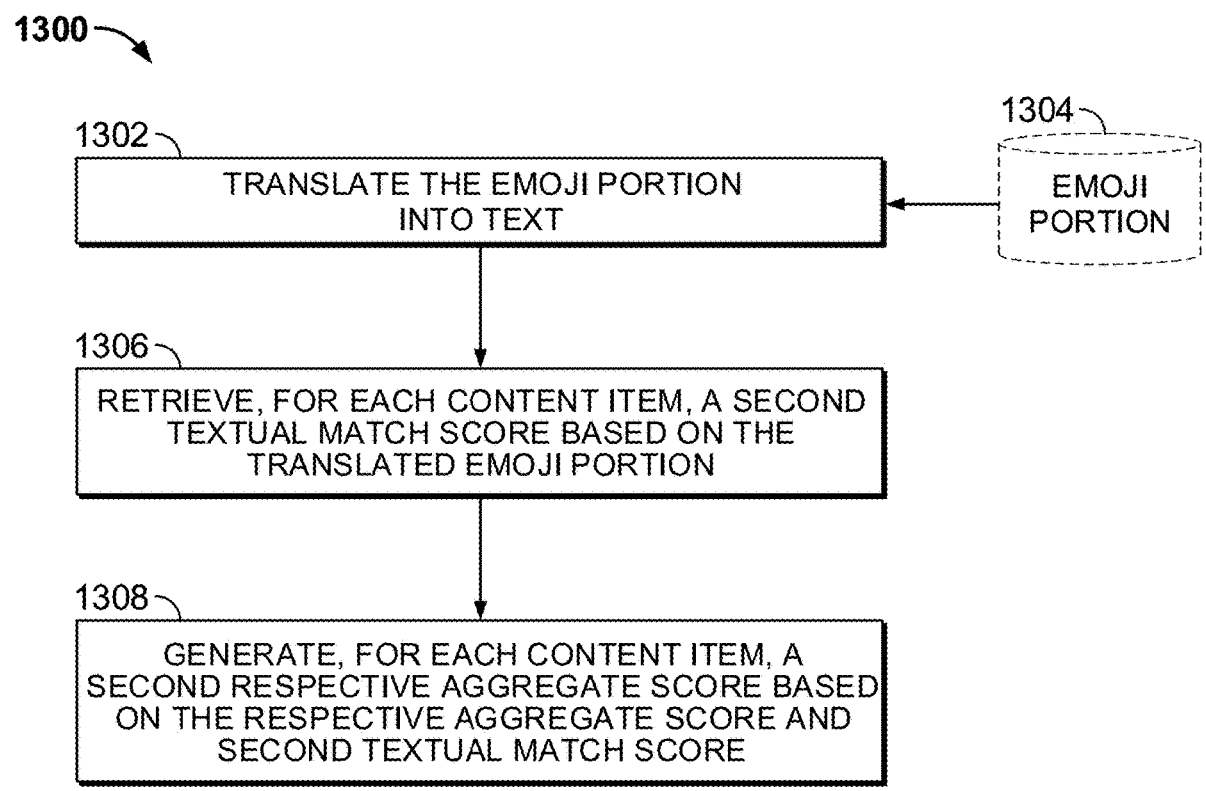
FIG. 13 shows a flowchart of a process for generating aggregate scores based on an untranslated emoji-based search query and a translated emoji-based search query, in accordance with some embodiments of the disclosure.

FIG. 13 shows a flowchart of a process for generating aggregate scores based on an untranslated emoji-based search query and a translated emoji-based search query, in accordance with some embodiments of the disclosure. At 1302, an emoji portion of a search query (e.g., emoji portion 1304) may be translated into a text string (e.g., using control circuitry 302). At 1306, a second textual match score is retrieved for each content item based on the translated emoji portion (e.g., using I/O path 308 and appropriate circuitry). At 1308, a second aggregate score is generated for each content item based on the respective aggregate score and second textual match score. For example, system 800 translates emoji portion 804 using control circuitry 302 and retrieves translated emoji match score 808 via I/O path 308 using appropriate circuitry. Score aggregator 810 generates the second aggregate score using control circuitry 302 for search results 816 based on emoji match scores 812, other match scores 814, and translated match scores 808.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating emoji-based metadata for content, the method comprising:
   identifying a content item posted via one or more social platforms;
   retrieving a quantity of instances of a reaction to the content item, the reaction corresponding to an emoji;
   retrieving a comment posted in association with the content item via the one or more social platforms;
   mapping the comment to the emoji based on a rule;
   generating a factor indicating a degree of relevance between the content item that was posted and the emoji, wherein the factor is generated based on the quantity of instances of the reaction and based on the mapping of the comment to the emoji; and
   storing, in a database, the factor in association with an identifier of the content item to facilitate processing of an emoji-based query.

2. The method of claim 1, wherein the content item comprises a portion, wherein the quantity of instances of a reaction is a first quantity, and the method further comprises:
   determining a second quantity of instances of the reaction associated with the portion of the content item;
   mapping the emoji to the portion based on the rule; and
   prior to storing the factor, associating the factor to the portion based on the second quantity of instances of the reaction.

3. The method of claim 2, further comprising:
   determining a genre of the portion of the content item; and
   prior to storing the factor, additionally associating the factor to the genre of the portion.

4. The method of claim 3, further comprising associating the genre to a profile.

5. The method of claim 1, wherein mapping the comment to the emoji based on the rule comprises:
   executing sentiment analysis on the comment;
   determining, based on the sentiment analysis, an emoji corresponding to the comment; and
   generating a mapping from the comment to the emoji.

6. The method of claim 5, wherein one or more emojis correspond to the comment based on the sentiment analysis, the method further comprising:
   determining weights associated with respective emojis based on sentiment analysis of the comment; and
   generating a mapping from the comment to the emojis based on the weights.

7. The method of claim 1, wherein the comment is automatically mapped to the emoji based on the rule.

8. The method of claim 1, wherein an instance of the reaction comprises an interaction with a reaction icon.

9. The method of claim 1, wherein generating the factor indicating the degree of relevance between the content item that was posted and the emoji comprises generating metadata based on the factor and the emoji.

10. The method of claim 1, wherein generating the factor indicating the degree of relevance between the content item that was posted and the emoji comprises generating the factor based on frequency of the instances of the reaction.

11. A system for generating emoji-based metadata for content, the system comprising:
    control circuitry configured to:
      identify a content item posted via one or more social platforms;
      retrieve a quantity of instances of a reaction to the content item, the reaction corresponding to an emoji;
      retrieve a comment posted in association with the content item via the one or more social platforms;
      map the comment to the emoji based on a rule; and
      generate a factor indicating a degree of relevance between the content item that was posted and the emoji, wherein the control circuitry is configured to generate the factor based on the quantity of instances of the reaction and based on the mapping of the comment to the emoji; and
    storage circuitry configured to:
      store, in a database, the factor in association with an identifier of the content item to facilitate processing of an emoji-based query.

12. The system of claim 11, wherein the content item comprises a portion, wherein the quantity of instances of a reaction is a first quantity, and wherein the control circuitry is further configured to:
    determine a second quantity of instances of the reaction associated with the portion of the content item;
    map the emoji to the portion based on the rule; and
    prior to storing the factor, associate the factor to the portion based on the second quantity of instances of the reaction.

13. The system of claim 12, wherein the control circuitry is further configured to:
    determine a genre of the portion of the content item; and
    prior to storing the factor, additionally associate the factor to the genre of the portion.

14. The system of claim 13, wherein the control circuitry is further configured to associate the genre to a profile.

15. The system of claim 11, wherein the control circuitry is configured to map the comment to the emoji based on the rule by:
    executing sentiment analysis on the comment;

determining, based on the sentiment analysis, an emoji corresponding to the comment; and generating a mapping from the comment to the emoji.

16. The system of claim 15, wherein one or more emojis correspond to the comment based on the sentiment analysis, and wherein the control circuitry is further configured to:

determine weights associated with respective emojis based on sentiment analysis of the comment; and generate a mapping from the comment to the emojis based on the weights.

17. The system of claim 11, wherein the comment is automatically mapped to the emoji based on the rule.

18. The system of claim 11, wherein an instance of the reaction comprises an interaction with a reaction icon.

19. The system of claim 11, wherein the control circuitry is configured to generate the factor indicating the degree of relevance between the content item that was posted and the emoji by generating metadata based on the factor and the emoji.

20. The system of claim 11, wherein the control circuitry is configured to generate the factor indicating the degree of relevance between the content item that was posted and the emoji by generating the factor based on frequency of the instances of the reaction.

* * * * *